United States Patent
Unger et al.

(10) Patent No.: US 10,882,375 B2
(45) Date of Patent: Jan. 5, 2021

(54) ACTIVE CHASSIS FOR A TWO-TRACK VEHICLE

(71) Applicant: AUDI AG, Ingolstadt (DE)

(72) Inventors: Andreas Unger, Gaimersheim (DE); Wolfgang Schmid, Freising (DE); Uli Schaaf, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 116 days.

(21) Appl. No.: 15/750,344

(22) PCT Filed: Aug. 1, 2016

(86) PCT No.: PCT/EP2016/001323
§ 371 (c)(1),
(2) Date: Feb. 5, 2018

(87) PCT Pub. No.: WO2017/041870
PCT Pub. Date: Mar. 16, 2017

(65) Prior Publication Data
US 2018/0222271 A1 Aug. 9, 2018

(30) Foreign Application Priority Data

Sep. 12, 2015 (DE) .................... 10 2015 011 924

(51) Int. Cl.
*B60G 17/016* (2006.01)
*B60G 17/017* (2006.01)
(Continued)

(52) U.S. Cl.
CPC ........... *B60G 17/0162* (2013.01); *B60G 3/26* (2013.01); *B60G 3/265* (2013.01); *B60G 7/006* (2013.01);
(Continued)

(58) Field of Classification Search
CPC .... B60G 17/0162; B60G 3/265; B60G 17/00; B60G 21/0555; B60G 17/0182;
(Continued)

(56) References Cited

U.S. PATENT DOCUMENTS 3,751,061 A * 8/1973 Scheuerpflug ........... B60G 3/26
280/86.751
3,857,093 A * 12/1974 Green ................ B60G 17/0408
324/609

(Continued)

FOREIGN PATENT DOCUMENTS

DE 102008052161 A1 5/2010
DE 102009008833 A1 8/2010
(Continued)

OTHER PUBLICATIONS

Examination Report dated Oct. 12, 2016 of corresponding German application No. 102015011924.9; 6 pgs.
(Continued)

*Primary Examiner* — Frank B Vanaman
(74) *Attorney, Agent, or Firm* — Maier & Maier, PLLC

(57) ABSTRACT

An active chassis for a two-track vehicle provided with a wheel suspension. A wheel carrier carrying a vehicle wheel is connected via connecting rod to the vehicle structure. The camber behavior of the vehicle wheel is defined by a mechanical camber curve of the vehicle wheels that is predetermined by the rigid kinematics of the connected rods, which defines a mechanical adjustment of the camber angle of the vehicle wheel depending on a spring path of the vehicle structure, and which is controllable with an actuator controller which can be controlled by a chassis control device.

6 Claims, 5 Drawing Sheets

(51) Int. Cl.
  *B60G 17/018* (2006.01)
  *B62D 17/00* (2006.01)
  *B60G 3/26* (2006.01)
  *B60G 21/055* (2006.01)
  *B60G 7/00* (2006.01)

(52) U.S. Cl.
  CPC ....... *B60G 17/017* (2013.01); *B60G 17/0182* (2013.01); *B60G 21/0555* (2013.01); *B62D 17/00* (2013.01); *B60G 2200/144* (2013.01); *B60G 2200/46* (2013.01); *B60G 2202/42* (2013.01); *B60G 2202/442* (2013.01); *B60G 2400/252* (2013.01); *B60G 2400/60* (2013.01); *B60G 2400/63* (2013.01)

(58) Field of Classification Search
  CPC ........ B60G 17/017; B60G 7/006; B60G 3/26; B60G 2400/63; B60G 2400/252; B60G 2202/442; B60G 2202/42; B60G 2200/46; B60G 2200/144; B60G 2400/60
  See application file for complete search history.

(56) References Cited

U.S. PATENT DOCUMENTS

| | | | | |
|---|---|---|---|---|
| 3,942,815 | A * | 3/1976 | Schwenk | B60G 3/06 280/124.146 |
| 4,084,837 | A * | 4/1978 | Milner | B60G 3/26 267/221 |
| 4,191,274 | A * | 3/1980 | Goldberg | B60G 3/26 180/282 |
| 4,700,972 | A | 10/1987 | Young | |
| 5,238,261 | A * | 8/1993 | Ogiso | B60G 3/265 280/124.138 |
| 5,620,199 | A * | 4/1997 | Lee | B60G 3/265 280/124.138 |
| 6,027,130 | A * | 2/2000 | Kawabe | B60G 3/265 280/124.135 |
| 6,158,746 | A * | 12/2000 | Uchiyama | B60G 17/0162 280/5.503 |
| 2002/0144543 | A1 * | 10/2002 | Rothoff | B60G 17/01908 73/117.03 |
| 2003/0111812 | A1 * | 6/2003 | Carlstedt | B60G 7/006 280/124.16 |
| 2005/0006166 | A1 * | 1/2005 | Cho | B60C 19/00 180/282 |
| 2007/0080513 | A1 * | 4/2007 | Osterlanger | B60G 3/26 280/86.751 |

FOREIGN PATENT DOCUMENTS

| | | |
|---|---|---|
| DE | 102013211660 A1 | 12/2014 |
| EP | 0001009 A1 | 3/1979 |
| EP | 1997715 A2 | 12/2008 |
| FR | 2898299 A1 | 9/2007 |
| FR | 2944995 A1 | 11/2010 |
| JP | H05-213036 A | 8/1993 |

OTHER PUBLICATIONS

International Search Report dated Oct. 21, 2016 of corresponding International application No. PCT/EP2016/001323; 15 pgs.
Translation of the International Preliminary Report on Patentability dated Mar. 22, 2018 of corresponding International application No. PCT/EP2016/001323; 8 pgs.
Office Action dated Jul. 31, 2019, in corresponding German Application No. 10 2015 011 924.9 including partial machine-generated English language translation; 10 pages.
Office Action dated Apr. 9, 2020 in corresponding European Application No. 16 750 102.2; 10 pages including partial machine-generated English-language translation.
Office Action dated Jul. 3, 2020 in corresponding Chinese Application No. 201680052377.9; 15 pages including English-language translation.
German Office Action dated May 14, 2020, in connection with corresponding DE Application No. 10 2015 011 924.9 (13 pgs., including machine-generated English translation).

* cited by examiner $$F = c \cdot d_{zu} + d \cdot d_{zu}$$

$$F = c \cdot d_{zu} + d_{zu} \cdot d + F_a$$

$$F = c \cdot d_{zu} + F_a$$

ACTIVE CHASSIS FOR A TWO-TRACK VEHICLE

FIELD

The invention relates to an active chassis for a two-track.

BACKGROUND

In conventional vehicle axles, a change of the loading state leads to a spring deflection or to a rebound of the vehicle body. Depending on the design of the axle, the spring deflection or rebound are accompanied by an adjustment of the camber angle on the wheels of the vehicle.

The dependence between the deflection or rebound and the wheel camber angle is defined as a so-called camber curve, which is designed specifically for the constructive design of the vehicle axle. When designing the camber curve, various constraints must be taken into account, which influence the driving behavior of the vehicle during steering and braking maneuvers, in particular within the dynamic range of the vehicle. Furthermore, it should be also noted that due to the design of the axle and the tire load requirements, not any desired camber curves may be constructed.

The active chassis may in addition also be provided with an active suspension system, so that for example the level control and/or roll stabilization of the vehicle design can be carried out. The primary goal of an active suspension system is to calm the vehicle structure when driving on rough roads, and/or to ensure the horizontal positioning or inclination of the vehicle body construction when driving through curves and/or to provide compensation for the vehicle deflection according to the load of the vehicle. When a new load is put on the vehicle, the vehicle structure is suspended along a spring path. With a corresponding control of the suspension system, the level control can be carried out so that the vehicle structure will be lifted again to the vehicle level in the unloaded state.

This level adjustment is accompanied by an adjustment of the wheel camber angle, which, however, is not focused on when controlling the active suspension system. The adjustment of the camber angle is thus subject to numerous conflicting goals and it can be optimized according to on a new loading state only to a very limited extent.

A generic active chassis is provided with a wheel carrier supporting a vehicle wheel, which is connected via connecting rods to the vehicle body. The camber behavior of the vehicle wheel will be in this case determined by a mechanical camber curve, which is predetermined by the rigid kinematics of the connecting rods. The mechanical camber curve defines a mechanical camber angle adjustment of the vehicle wheel as a function of a deflection or of a rebound travel of the vehicle body. Therefore, the vehicle structure is deflected with spring deflection about a spring path with an additional load, and in particular with an adjustment of the camber angle which is determined by the mechanical camber curve. In addition, a generic chassis is provided with a camber actuator, which can be controlled by a chassis control device as a function of a plurality of driving mode parameters, and which can—in addition to a mechanical adjustment of the camber angle—also carry out an active camber angle adjustment.

SUMMARY

The objective of the invention is to provide an active chassis for a two-track vehicle, with which the camber behavior of the wheels of the vehicle can be improved in a simple manner under different loading conditions of the vehicle.

According to the disclosure, the chassis control unit is associated with an evaluation unit which is provided with a load sensor and which detects a change of the vehicle loading state. The evaluation unit controls the camber factor actuator as a function of the change of the loading state in order to set the stationary camber angle and/or the camber gradients of the respective vehicle wheels by means of the deflection or rebound, as well as independently of the axle design of potentially installed active suspension systems. The camber behavior can be adapted to the new loading state by means of the evaluation system, and in particular so that a compensation can be provided for the changed loading/unloading yaw behavior of the vehicle.

By way of an example, the camber behavior of the respective vehicle wheel can always be maintained as constant regardless of the load (loading state). As an alternative to this, the evaluation unit can control the camber actuator with a change of the loading state in such a way that with an increased load, the amount of the negative camber angle will be increased (in comparison to a purely mechanical camber angle adjustment), and/or so that the camber gradient is reduced at the rear axle by means of a deflection path in order to improve the driving safety. Generally, the camber behavior can be freely adjusted by means of the evaluation unit when a change of the load is present.

In a technical implementation, the evaluation unit is a software module of the chassis control device. The evaluation unit can create an actuator camber curve on the basis of the loading state that is detected by the load sensor system, so that an active camber angle adjustment is defined for the respective wheel of the vehicle (created on the basis of the change in the loading state) depending on the spring path of the vehicle structure.

The evaluation unit's control overlaps with the camber actuator control of the actuator camber curve of the mechanical camber curve, wherein an overall camber curve is formed which reproduces the adjustment of the camber angle at the vehicle wheel.

The actual weight of the vehicle and the position of the vehicle can be used to determine the actual loading state. By way of an example, the mass of the additional load as well as the position of the center of gravity of the additional load can be determined starting from an unloaded vehicle, and these values can be forwarded to the evaluation unit as input parameters. The evaluation unit thus determines the actuator camber curve on this basis.

The evaluation unit determines the deflection or rebound path as a further input parameter that is associated with the change of the loading state. The actuator camber curve detected on the basis of the deflection or rebound path is stored in the evaluation unit and a camber signal is generated with which the camber actuator of the vehicle wheel can be controlled.

The active chassis can be additionally also provided with an active suspension system having an adjusting unit which acts between the vehicle structure and the wheel guide elements (which is to say the wheel carrier or the guiding rods). The adjusting unit can be controlled in combination with the camber actuator or independently thereof by the vehicle control device and it is used in particular for a level adjustment and/or for roll stabilization of the vehicle structure. For example, the adjusting unit may be an air spring supported between the vehicle structure and the wheel guide elements. As an alternative, the adjusting unit may be an assembly of torsion bars. Such an assembly of torsion bars is provided with a chassis-side attached torsion actuator, which can be connected via a torsion bar as well as via an output lever that is articulated for example with a wheel-connecting rod connected to the wheel suspension.

When the torsion actuator is actuated, the torsion rod is subjected to torsion, whereby it exerts a biasing force on the wheel-connecting rods. The actuation of the torsion actuator is carried out during the driving operation in order to calm the vehicle structure on rough roads and/or for a roll stabilization of the vehicle body.

In a technical realization, the camber actuator may be an active connecting rod, which is supported between the wheel carrier and the vehicle structure and which has a telescopically adjustable length with a corresponding actuation by the chassis control device. As an alternative, the camber actuator can be arranged on the side of the installation area directly at the wheel carrier. In this case, the wheel carrier can be designed for example in two parts, in particular with a vehicle wheel carrying element on the wheel side and with a carrying element supporting the wheel on the side of the axle which is connected by means of the connecting rods to the structure of the vehicle. It is preferred when the camber actuator is provided with a wheel-side rotary part and with an axle-side rotary part, so that the parts are rotatable relative to each other about their axes of rotation. The wheel-side rotary part can be deflected during the rotation of at least one rotary part with a tumbling motion and in particular by setting the wheel camber angle. Both rotary parts of the camber actuator can be actuated at least by means of an electric motor which can be controlled with the evaluation unit of the chassis control device.

The axis of rotation of the wheel-side rotary part may be in a technical execution of the wheel carrier in two parts inclined at an inclination angle relative to the rotational axis of the axle-side rotary part. The wheel-side rotary part can therefore be rotated about its central axis in a tumbling motion with a variable pivot angle about the axis of rotation of the axle-side rotary part. The actuator disclosed in DE 10 2009 008 833 A1 is hereby incorporated by reference in this context with regard to the chassis construction and to the mode of operation of such a construction.

The advantageous embodiment and/or further developments of the invention mentioned above and/or in the dependent claims can be used individually or in any desired combination—with the exception of, for example, cases of clear dependencies or incompatible alternatives.

BRIEF DESCRIPTION OF THE DRAWINGS

The invention and its advantageous embodiments and development and their advantages will be explained next in more detail with reference to the drawings.

The drawings show the following.

DETAILED DESCRIPTION OF THE DRAWINGS

Figure 1:
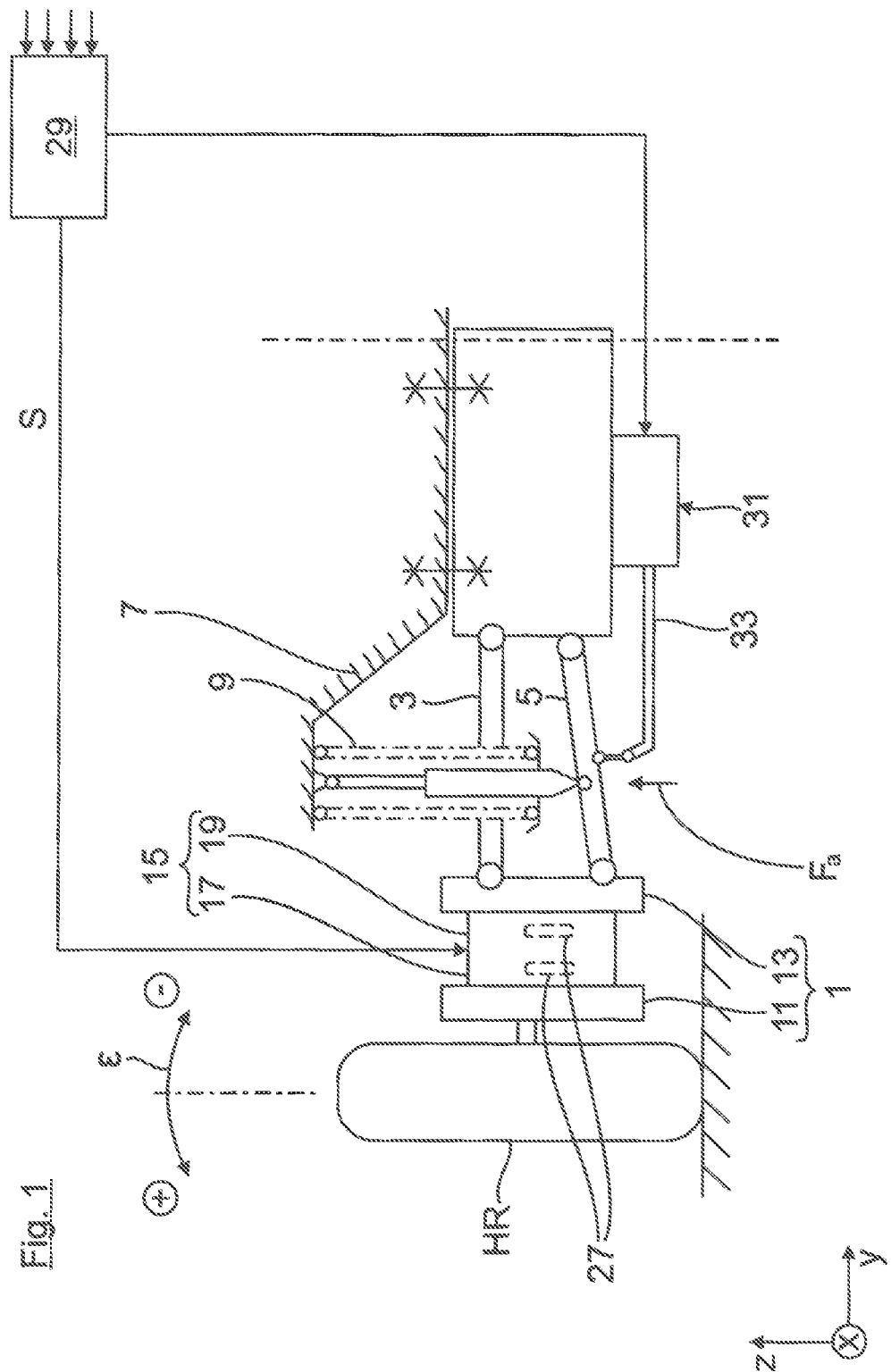
FIG. 1 is a schematic representation of a wheel suspension of an active chassis for a two-track vehicle.
Figure 2:
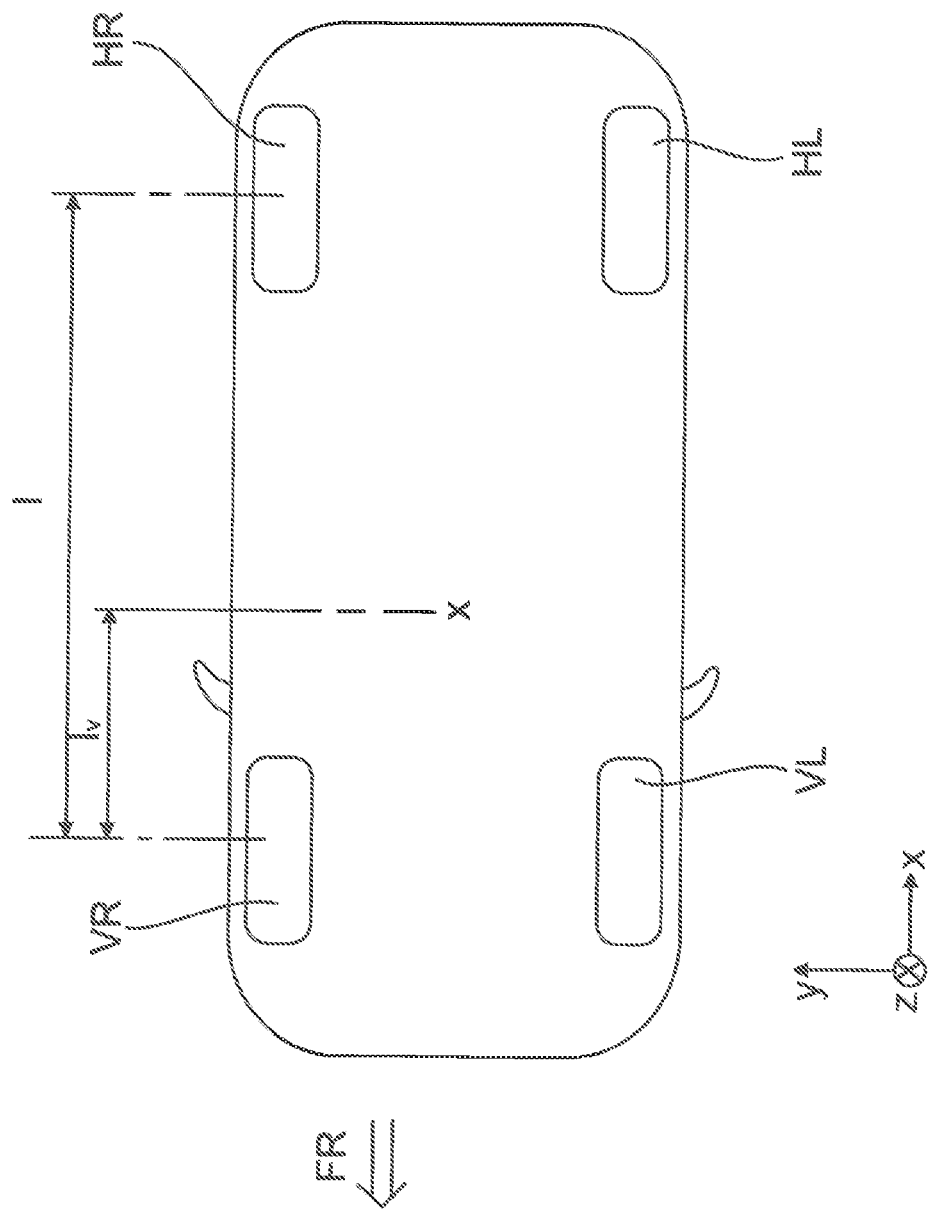
FIG. 2 shows an outline view of the two-track vehicle.

FIG. 1 shows a partial view of an active chassis for a two-track vehicle, which is equipped by way of an example with a wheel carrier 1 supporting the rear right wheel HR 1 that is connected by means of the upper and lower transverse link at the vehicle structure 7. The transverse links 3, 5 are respectively articulated on the side of the body of the vehicle. Between the lower transverse link 5 and the vehicle structure 7 is supported in the usual manner a suspension strut 9 with a bearing spring, as well as with a vibration damper.

As shown in FIG. 1, the wheel carrier 1 consists of two parts, a wheel-side carrying element 11 and an axle-side carrying element 13. In addition, a braking device, not shown in the figure, can be attached to the wheel-side carrying element 11. At the axle-side carrying element are articulated both transverse links 3, 5 via link bearings.

The mechanical camber behavior of the vehicle wheel HR is determined by a mechanical camber curve $S_M$, which is in turn predetermined by the rigid kinematics of the links 3, 5, defining a mechanical camber angle adjustment of the vehicle wheel HR as a function of a deflection or rebound path d of the vehicle structure 7. With the chassis configuration having the mechanical camber curve $S_M$ shown in FIG. 4, an increase of the total vehicle mass leads to a relative increase of the (negative) static camber, which is particularly meaningful with passive axles.

In addition to the mechanical camber adjustment, an active camber adjustment can be provided by means of a camber actuator 15 which is interposed between both carrying elements 11, 13. The camber actuator 15 is provided with a wheel-side rotary part 17 and with an axle-side rotary part 19. Both rotary parts 17, 19 of the camber actuator 15 are connected to each other via inclined control surfaces. The control surfaces are located in a plane of rotation in which they can be mutually slidably mounted, for example so that they are in a sliding contact with each other.

The rotary parts 17, 19 are rotatably mounted about their axes of rotation between both carrying elements 17, 19. As shown in FIG. 1, the axis of rotation of the wheel-side rotary part 17 is aligned in the vehicle transverse direction y so that it is coaxial to an axis of rotation of the axle-side rotary part 19. With a rotational actuation of at least one of the rotary parts 17, 19, the wheel-side rotary member 17 is moved with a tumbling motion at a variable pivoting angle about the wheel axle, whereby the camber angle ε is actively adjusted at the rear wheel HR.

Both rotary parts 17, 19 can be controlled by means of electric motors 27, which are in signal communication with a chassis control unit 29. During driving operations, the chassis control unit 29 generates a control signal S as a function of a plurality of driving parameters by means of which the electric motors 27 of the camber actuator 15 can be actuated for an active camber angle adjustment.

In addition, the chassis control unit 29 is in signal communication with an actuating unit 31 of an active suspension system. As shown in FIG. 1, the actuating unit 31 is provided by way of an example with a torsion bar spring arrangement. This arrangement is equipped with a rotary actuator 31, which is mounted at the vehicle structure 7 and is in operative connection via a torsion bar 33 with the lower transverse link 5 of the wheel suspension. With a corresponding control of the rotary actuator 31, the lower transverse link 5 is impacted by actuator force $F_A$, and in particular ensures the level control and/or roll stabilization of the vehicle structure 7 during driving operations.

The wheel suspension shown in FIG. 1 is illustrated by way of an example for the rear right wheel HR. The wheel suspensions of the other wheels HL, VL and VR of the vehicle are constructed in an identical manner, so that to each of the vehicle wheels is assigned a camber actuator 15 as well as an actuating unit 31, which are respectively controlled by the chassis control unit 29.

Figure 3:
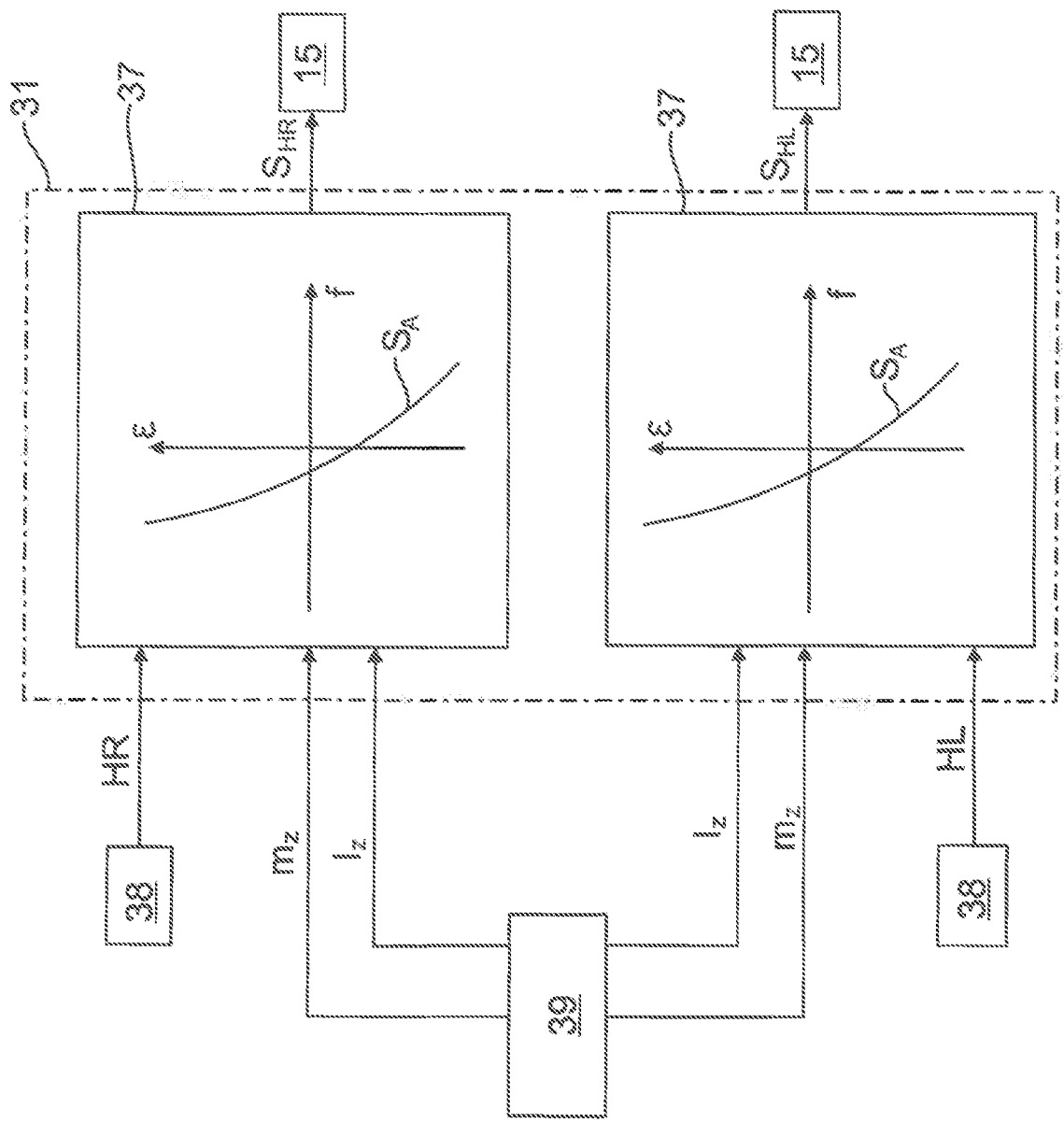
FIG. 3 is a block diagram indicating the software architecture in the vehicle control device.

As shown in FIG. 3, the control unit 29 is provided with an evaluation unit 37 for each of the rear vehicle wheels HL, HR, by means of which a camber angle adjustment can be influenced when the vehicle loading status changes. The front wheels VL, VR are also assigned to the evaluation units 37, which are, however, omitted in FIG. 3 in order to simplify the illustration.

Each of the evaluation units 37 is in signal communication with a loading sensor system 39, by means of which the actual loading state of the vehicle can be detected. For this purpose, the loading sensor system 39 detects the additional weight $m_Z$ as well as the longitudinal position $l_Z$ of the center of gravity of the additional weight. The evaluation unit 37 then determines on the basis of the actual loading state an actuator camber curve $S_A$. In addition, each of the evaluation units 37 is in signal communication with a spring path sensor system 38, by means of which a spring path $d_{HR}$ and $d_{HL}$ can be detected which results from the additional weight on the rear wheels HR, HL. The evaluation units 37 generates on the basis of the actuator camber curve $S_A$ and of the spring path $d_{HR}$, $d_{HL}$ a camber angle signal $S_{HL}$, $S_{HR}$, by means of which the camber actuator 15 can be controlled on the right and on the left rear wheel HL, HR. The mechanical camber curve $S_M$, which is determined only by the rigid kinematics of the links 5, 7, can thus be additionally influenced in this manner by the actuator curve $S_A$ which is freely adjustable with the evaluation unit 37, wherein the camber behavior, which is to say the camber angle and the camber gradient, can be respectively adjusted according to the current loading state in order to improve driving safety.

Figure 4:
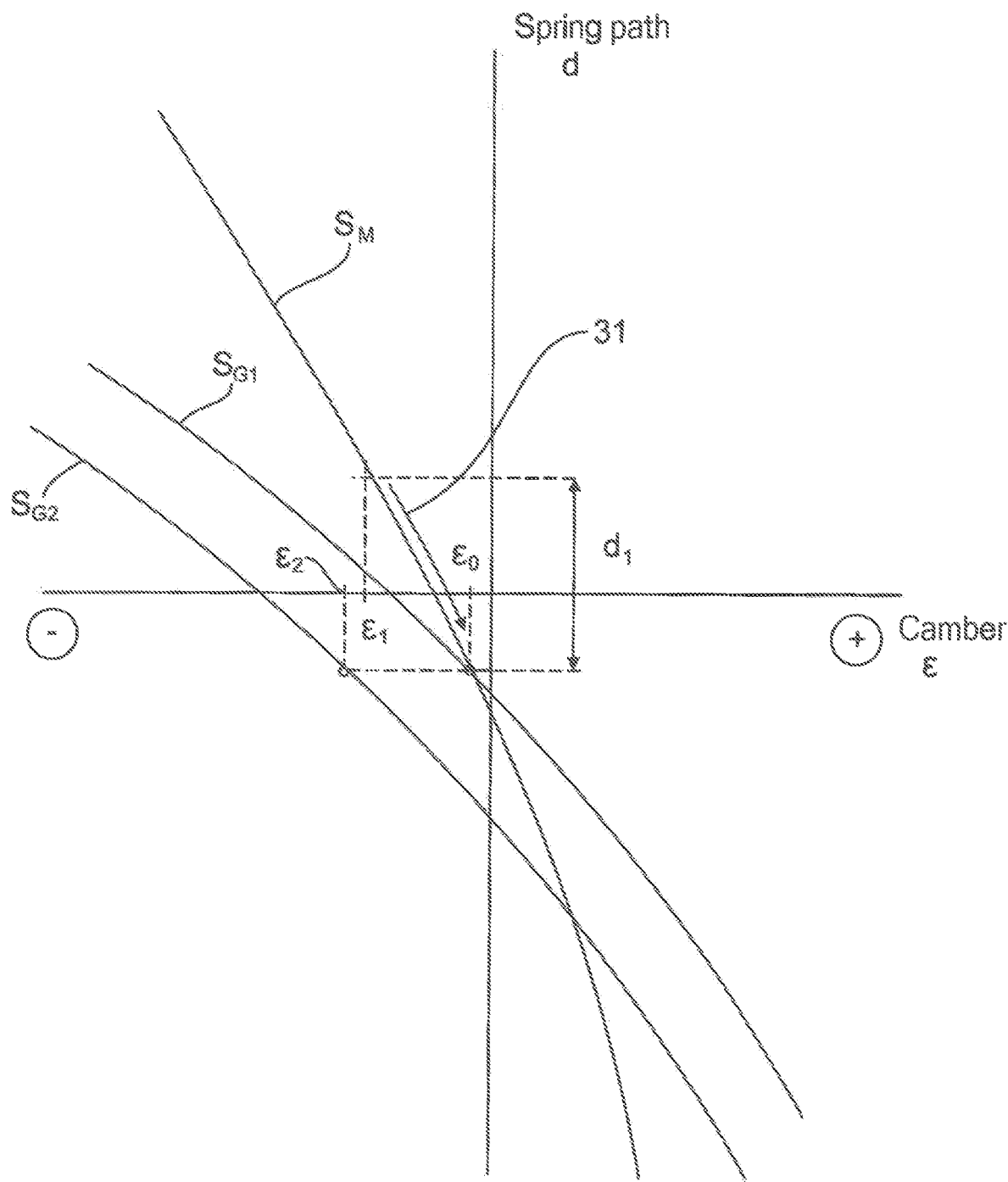
FIG. 4 is a camber curve diagram illustrating the mode of operation of the invention.

The operation of the evaluation unit 37 will be explained next based on the reference to the camber curve diagram of FIG. 4. For example, the diagram of FIG. 4 shows a mechanical camber curve $S_M$, which is defined solely by the rigid kinematics of the transverse links 5, 7. The mechanical camber curve SM influences an actuator camber curve SA, not shown in FIG. 3, by means of the evaluation unit 37, which results in a total camber curve $SG_1$ acting on the vehicle wheel HR.

The interaction of the camber actuator 15 and the actuating unit 31 will be described next for the case when an additional load is added to an unloaded vehicle: In this case, the vehicle structure 7 is deflected by the spring path $d_1$ of FIG. 4. This results in an angle adjustment which is determined by the mechanical camber angle of the mechanical camber curve $S_M$ from a camber angle $\varepsilon_0$ to a camber angle $\varepsilon_1$. As a result of the adjustment by the adjusting unit of the active suspension system 31 according to prior art (indicated by the arrow 31), a level adjustment is performed so that the vehicle structure 7 will be raised again with the spring path $d_1$ to the vehicle structure level in the unloaded state. The level control can be superimposed in the technical realization on the deflecting operation.

The level adjustment described above is thus accompanied by an adjustment of the camber angle from the camber angle $\varepsilon_1$ to the camber angle $\varepsilon_0$, which may be detrimental to the driving safety. In order to improve the driving safety, the mechanical camber curve $S_M$ can be influenced by the actuator camber curve $S_A$. The actuator camber curve SA is designed in such a way that the result is a total camber curve $S_{G1}$ which acts on the rear wheel HR, which—in comparison to the mechanical camber curve $S_M$—provides a reduced camber gradient.

As an alternative, an actuator camber curve $S_A$ can be generated by the evaluation unit 37, which results in a total camber curve $S_{G2}$ (FIG. 4) acting on the rear wheel HR. The camber curve $S_{G2}$ is in FIG. 4 shifted parallel to the left relative to the camber curve $S_{G1}$. This means that in comparison to the mechanical camber curve, not only a reduced camber gradient is provided, but a component of an enlarged negative camber angle $\varepsilon_2$ is also provided.

Figure 5:
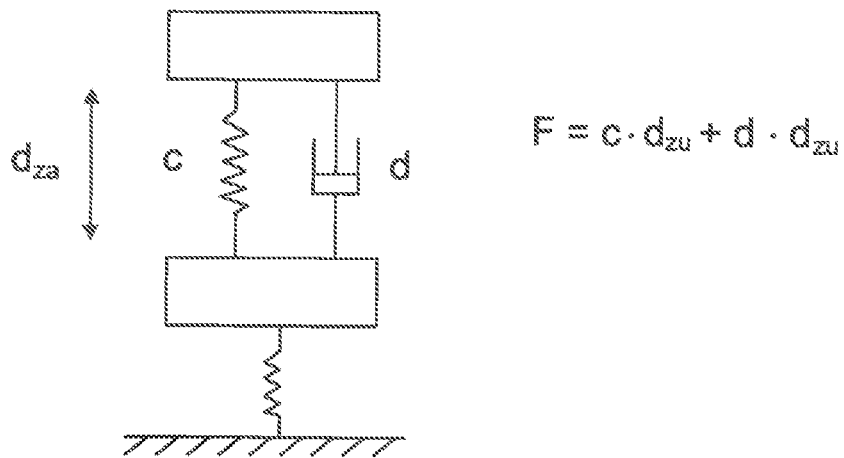
FIG. 5 shows a replacement model of a chassis configuration.
Figure 6:
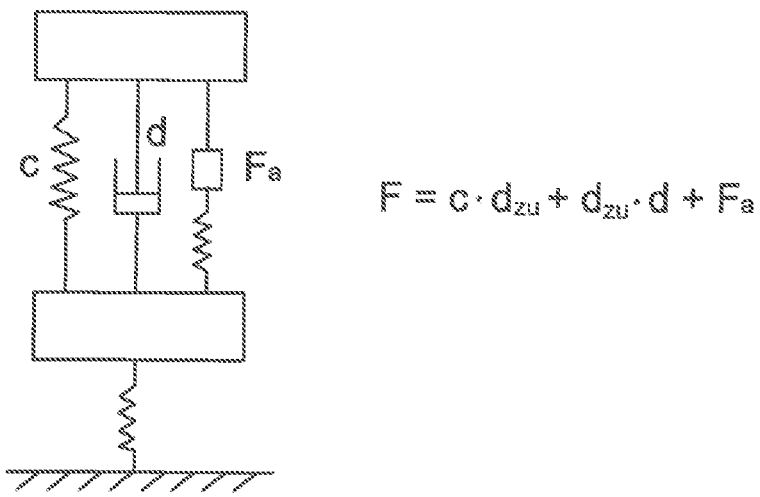
FIG. 6 shows a replacement model of a chassis configuration.
Figure 7:
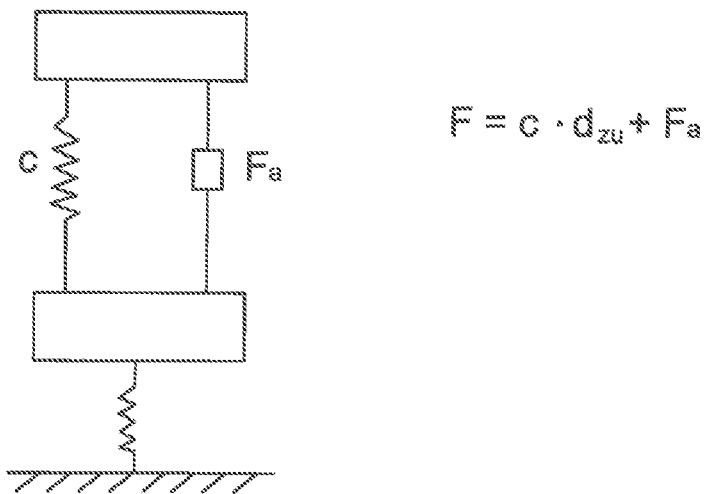
FIG. 7 shows a replacement model of a chassis configuration.

In the case of the additional load mentioned above, the additional mass as well as the longitudinal position of the center of gravity of the additional load are determined in the loading sensor system 39. The mode of operation of the loading sensor system 39 is based on the determination of the vertical forces acting on the chassis and it is a function of the configuration of the chassis. FIG. 5 through 7 suggest a calculation method for the vertically acting total force F as an example used for three different chassis configurations. In this case, c is the known spring constant of the suspension spring, d is the known damping amount of the vibration damper, $F_a$ is the known actuator force of the actuating unit 10, and $D_{ZU}$ is the measured spring path. The forces were determined separately for each vehicle wheel. In order to determine the dynamic influences, which are caused by driving over bumps, the vertical forces are subjected to a signal filtration with a very slow low-pass filter. Typical time constants of the low-pass filter are in the range of 5 seconds.

If the additional load in the vehicle is for example shifted towards the rear, then the loading sensor system 39 will detect a new actual loading state. The evaluation unit 37 thus determines on this basis an actuator camber curve $S_A$, which leads to an increase of the camber curve gradient acting on the vehicle and which contributes to a more stable driving behavior in the dynamic driving limit range. This counteracts the increased tendency towards an excessive control of the vehicle due to the additional weight on the rear axle.

The invention claimed is:

1. An active chassis for a two-track motor vehicle provided with a wheel suspension, comprising:
a wheel carrier carrying a vehicle wheel connected via connecting rods to a vehicle structure, wherein a camber behavior of the vehicle wheel is determined by a mechanical camber curve predetermined by the rigid kinematics of the connecting rods defining a mechanical adjustment of a camber curve of the vehicle wheel as a function of a spring path of the vehicle structure, and with a camber actuator, controlled by a chassis control device for carrying out an active camber angle adjustment, so that with a change of the vehicle loading state of the vehicle structure, a deflection or a rebound is carried out with the spring path, and with a corresponding adjustment of the mechanical camber angle, wherein in order to control the camber actuator, an evaluating unit is assigned to the chassis control device, which controls the camber actuator when the loading state is changed, and in order to counteract at least partially the mechanical camber angle adjustment with an active camber angle adjustment, or in order to support the mechanical camber angle adjustment, wherein the evaluating unit determines an actuator camber curve on the basis of a current loading state of the vehicle, and wherein the evaluating unit influences the actuator camber curve by controlling the camber actuator of the mechanical camber curve, creating a total camber curve, wherein in order to determine an actual loading state, a loading sensor system is in communication with the evaluating unit, by which a change in weight of a load and a change in a longitudinal position of a center of gravity of the load are determined, and are detected as an input parameter obtained by the evaluating unit and on the basis of which the evaluating unit determines the actuator camber curve, and wherein the evaluating unit is in communication with a spring path sensor system to detect a spring path resulting from the change in the vehicle loading state.

2. The active chassis according to claim 1, wherein the evaluating unit detects as another input parameter the spring path with a deflection or a rebound of the vehicle, and the evaluating unit can be controlled on the basis of the spring path and the actuator camber curve generates a camber angle signal by which the camber actuator can be controlled.

3. The active chassis according to claim 1, wherein the chassis is provided with an actuating unit acting between the vehicle structure and the wheel carrier or connecting rods, which is employed for level control and/or for roll stabilization of the vehicle structure, and the actuating unit is controlled with the chassis control device in combination with the camber actuator.

4. The active chassis according to claim 1, wherein the camber actuator is associated with the wheel carrier, and the wheel carrier is formed in two parts with a carrying element on a wheel side and with a carrying element carrying the vehicle wheel on an axle side, which is connected via the connecting rods at the vehicle structure, and that the camber actuator is arranged between the carrying elements.

5. The active chassis according to claim 4, wherein the camber actuator is provided with a wheel-side rotary part and with an axle-side rotary part, which are rotatable relative to each other about axes of rotation of the wheel-side rotary part and the axle-side rotary part, and the wheel-side rotary part is adjustable during the rotation of at least one of the rotary parts relative to the axle-side rotary part, wherein the adjustment is a camber angle adjustment, and wherein the rotary parts are rotated by an electric motor which can be controlled by the chassis control device.

6. The active chassis according to claim 4, wherein the camber actuator is a linear actuator or an active connecting rod which is supported between the wheel carrier and the vehicle structure, and the linear actuator is telescopically adjustable in length by the chassis control device.

* * * * *